3,437,685
DIHALOSULFONES
Harry F. Brust, Midland, Mich., assignor to The Dow Chemical Company, Midland, Mich., a corporation of Delaware
No Drawing. Filed July 14, 1964, Ser. No. 382,642
Int. Cl. C07c 147/02
U.S. Cl. 260—481    4 Claims The present invention is directed to the novel dihalosulfones having the formula $$RSO_2CH_2CX_2Y$$

In this and succeeding formulae, R represents benzyl or alkyl containing up to and including 12 carbon atoms, X represents halogen, Y is a carboxylic acid derived group such as carboxyl, represented by the formula —COOH; nitrile, represented by the formula —CN; lower alkoxycarbonyl (carboxylic acid ester), represented by the formula —COOR$_1$; or carbamoyl represented by the formula —CONH$_2$; and R$_1$ represents lower alkyl. In the present specification and claims, the expressions lower alkyl and lower alkoxy are employed to refer to radicals containing up to and including 4 carbon atoms and halogen to refer to chlorine and bromine. The compounds of the present invention are liquids or solids which are of low solubility in water and somewhat soluble in many organic solvents. They have been found to be useful as pesticides for the control of various insects, mites, fish, bacteria, fungi, gastropods and plants.

The nitrile compounds of the present invention having the formula $$RSO_2CH_2CX_2CN$$

are prepared by reacting a propionitrile compound having the formula $$RSO_2CH_2CH_2CN$$

with a halogenating agent, namely, chlorine or bromine chloride. The reaction preferably is carried out in the presence of an organic liquid as reaction medium. Representative examples of such organic liquids include carbon tetrachloride, chloroform, methylene chloride, and carbon bisulfide. The reaction takes place readily at a temperature of from 0 to 80° C. and is preferably carried out at a temperature from 15 to 70° C. The proportions of reactants to be employed are not critical, some of the desired product being formed immediately upon combining the reactants in any proportion. However, the reaction in going to completion produces one molar proportion of the desired product and two molar proportions of hydrogen chloride of reaction. Accordingly, two molar proportions of halogenating agent are consumed for every molar proportion of propionitrile, with the employment of such proportions or the employment of the halogenating agent in a 15 percent excess of such proportions being preferred.

In carrying out the reaction, a propionitrile such as 3-(tertiary-butylsulfonyl)propionitrile, 3-(4-methylpentylsulfonyl)propionitrile, 3-(undecylsulfonyl)propionitrile and 3-(decylsulfonyl)propionitrile is dispersed in the organic liquid and a halogenating agent such as chlorine or bromine chloride is added. In a preferred method, the halogenating agent is added to the reaction mixture portionwise with stirring. During the halogenation, the reaction temperature is maintained in the reaction temperature range until the reaction is complete. The desired product precipitates during the halogenation procedure and is removed from the reaction medium by such conventional procedures as decantation or filtration. This solid product can be further purified in known procedures such as recrystallization from an organic solvent or washing with an organic solvent.

The dihalosulfonylpropionic acid compounds having the formula $$RSO_2CH_2CX_2COOH$$

are prepared by the water hydrolysis of the dihalopropionitrile compounds which are prepared as described in the foregoing paragraphs. The hydrolysis is effected in the presence of a catalytic amount of a hydrolysis catalyst such as a mineral acid. Preferred catalysts include sulfuric acid, toluene sulfonic acid, phosphoric acid, etc. The reaction is carried out at a temperature of from 25–120° C. and is preferably carried out at a temperature of from 50–100° C. The reaction in going to completion consumes two moles of water for every mole of propionitrile employed and the employment of at least two moles of water per mole of propionitrile is preferred. In effecting the reaction, the reactants are combined in any convenient manner, and the desired product obtained from the reaction separated as previously described.

The carboxylic acid ester compounds of the present invention having the formula $$RSO_2CH_2CX_2C\begin{matrix}\diagup O \\ \diagdown O-R_1\end{matrix}$$

can be prepared by reacting together a propionitrile having the formula RSO$_2$CH$_2$CX$_2$CN, a lower alkanol, and a mineral acid followed by reaction with water. In a preferred embodiment, the reaction is carried out in an inert organic solvent as reaction medium. The desired product is obtained and the reaction proceeds smoothly at temperatures between —5° and 40° C. with temperatures between 0° and 20° C. being preferred. The amounts of the reactants to be employed are not critical, some of the desired product being formed when combining the reactants in any proportions. However, the reaction consumes the propionitrile, the strong acid such as sulfuric acid or hydrochloric acid, the lower alkanol and water in equimolar proportions. In a preferred procedure, equimolecular proportions of the propionitrile, lower alkanol and mineral acid reagents are employed, and the resulting reaction mixture is contacted with an excess of water.

In carrying out the reaction, the propionitrile, strong acid, and lower alkanol can be contacted together in any order or fashion and, if desired, in the presence of an inert organic solvent such as diethyl ether, methylene chloride or chloroform. In a convenient procedure, the propionitrile, acid, and lower alkanol are contacted together in any order or fashion and at the contacting temperature range and the water thereafter added with stirring. In a preferred procedure, water is employed in molar quantities equal to at least two times the molar amount of propionitrile employed. During the reaction, the reaction mixture separates into an organic solvent layer and an aqueous layer. Following the reaction, the reaction mixture is filtered, and the organic layer separated by decantation and thereafter concentrated by fractional distillation under reduced pressure to remove the low boiling constituents and obtain the carboxylic acid ester as a liquid or solid residue. This residue can be further purified by such conventional procedures as washing or recrystallization from or extraction with an organic solvent.

In an alternative procedure, the propionic acid compounds of the present invention can be employed as starting materials for the production of the ester compounds of the present invention. In such a method, the acids are esterified with a lower alkanol. The esterification conveniently can be carried out in an organic liquid as reaction medium such as toluene, benzene or an excess of the employed lower alkanol, and in the presence of a catalytic amount of an esterification catalyst such as p-toluenesulfonic acid or sulfuric acid. The reaction takes place readily at temperatures of from 50 to 115° C. and when employing any proportions of the reagents. In effecting the reaction, the reagents can be combined in any order with equimolecular proportions thereof being preferred. Upon completion of the esterification, the desired ester compound is separated as described in the foregoing paragraph.

The amide products of the present invention, having the formula

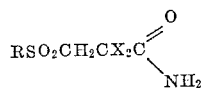

can be conveniently prepared by reacting successively a propionitrile compound of the present invention with sulfuric acid and water. The reaction can be carried out in an inert hydrocarbon liquid such as hexane and carbon tetrachloride as reaction medium. The reaction with the sulfuric acid proceeds at temperatures between 25 and 80° C. but preferably between 40 and 70° C. The proportions of the reactants to be employed are not critical, some of the desired product being produced when employing the reactants in any proportions. The reaction consumes the reactants in substantially equimolar proportions, however, it is preferred that the sulfuric acid and water be employed in excess with respect to the propionitrile starting material.

In carrying out the reaction, the propionitrile and sulfuric acid are contacted together in any order or fashion, and in the presence of an organic liquid, if desired. The reaction mixture is maintained at the reaction temperature for a short period and thereafter diluted with water. The dilution is carried out with stirring and at temperatures of from 0 to 50° C. Following the addition of the water, the desired amide product precipitates in the reaction mixture as a crystalline solid. This product is collected by conventional procedures such as filtration or decantation. The solid product can be further purified by washing and/or recrystallization.

In an alternative procedure, the amide compounds can be obtained as a by-product in the preparation of the carboxylic acid ester compounds of the present invention. Thus, following the reaction of the propionitrile, lower alkanol, mineral acid and water, a small amount of the amide product exists in the reaction mixture as a crystalline solid. The product can be separated by filtration of the crude reaction mixture, and thereafter purified as previously described.

The followng examples merely illustrate the invention and are not to be construed as limiting.

Example 1.—2,2-dichloro-3-(ethylsulfonyl)propionitrile

CH₃CH₂SO₂CH₂CCl₂CN

3 - (ethyl - sulfonyl)propionitrile (22.9 grams; 0.156 mole) is dispersed in 100 grams of carbon tetrachloride and gaseous chlorine (22 grams; 0.282 mole) bubbled therethrough with stirring. The addition is carried out at a temperature of from 20° to 25° C. and over a period of 11 hours. During the chlorination, the solid 2,2-dichloro-3-(ethylsulfonyl)propionitrile product precipitates as a solid. This solid is removed by filtration, and recrystallized from ethanol. The recrystallized product has a melting point of 92–94° C. and a chlorine content of 32.68 percent as compared with a theoretical content of 32.85 percent. Infrared and nuclear magnetic resonance spectra confirm the structure of the product.

Example 2.—ethyl 2,2-dichloro-3-(ethylsulfonyl)-propionate

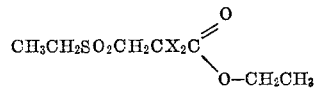

2. dichloro-3-(ethylsulfonyl)propionitrile (43.2 grams; 0.200 mole) is dispersed in 400 grams of methylene chloride and 9.2 grams (0.22 mole) of absolute ethanol. Gaseous hydrogen chloride (13.1 grams; 0.359 mole) is then added to the mixture at 0° C. and over a period of 3.3 hours. Following the addition, the reaction mixture is mixed with ice water and set aside at room temperature for 20 minutes and thereafter filtered. The organic layer, which separates following the addition of water, is thereafter collected by decantation, and the solvent removed therefrom by evaporation to give the ethyl-2,2-dichloro-3-ethylsulfonyl propionate product as a solid material. This product is purified by successive recrystallization from carbon tetrachloride and from aqueous ethanol to yield a white crystalline product which melts at 69–71° C. The recrystallized product has chlorine and sulfur contents of 27.1 percent and 12.74 percent as compared with the theoretical values of 27.0 percent and 12.8 percent, respectively.

During the filtration step as described in the preceding paragraph, the 2,2 - dichloro-3-(ethylsulfonyl) propionamide product is obtained as a crystalline solid residue. This product has a melting point of 149–151° C. and a nitrogen content of 6.12 percent as compared to the theoretical content of 6.03 percent.

Example 3.—2,2-dichloro-3-(octylsulfonyl)-propionamide

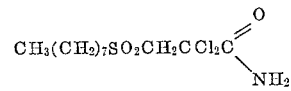

2,2 - dichloro-3-(octylsulfonyl)propionitrile (33 grams; 0.110 mole) is dispersed in 100 milliliters of concentrated sulfuric acid. The reaction mixture is warmed with stirring to a temperature of 60° C. and maintained at that temperature for 10 minutes. Following the heating period, the reaction mixture is cooled to room temperature, whereupon the reaction mixture is poured into 500 milliliters of ice water. The solid 2,2-dichloro-3-(octylsulfonyl)propionamide product precipitates immediately upon the addition of the sulfuric acid solution to the water. The solid product is then collected by filtration and dried. The 2,2-dichloro-3-(octylsulfonyl)propionamide product melts at 99°–100° C. and has chlorine, sulfur and nitrogen contents of 22.27 percent, 10.12 percent and 4.23 percent, respectively, as compared with 22.45 percent, 10.08 percent, and 4.40 percent, respectively.

Example 4.—2,2-dibromo-3-(ethylsulfonyl)-propionitrile

Bromine chloride (22.1 grams; 0.2 moles) dispersed in 50 milliliters of carbon tetrachloride is added with stirring to 3-(ethylsulfonyl)propionitrile (14.7 grams; 0.1 mole) dispersed in 150 milliliters of carbon tetrachloride. The addition is carried at a temperature of 50 to 60° C. and over a period of 1.5 hours. Stirring is thereafter continued for one-half hour, and the reaction mixture thereafter blown with gaseous nitrogen for one-half hour. Following this period, the white crystals of the 2,2-dibromo-3-(ethylsulfonyl)propionitrile product which precipitate during the reaction are separated by filtration and recrystallized from absolute ethanol. The recrystallized product melts at 113 to 115° C. and has bromine, nitrogen, and sulfur contents of 50.5 percent, 4.56 percent, and 10.6 percent, respectively, as compared with the theoretical contents of 52.4 percent, 4.6 percent, and 10.5 percent, respectively.

Example 5.—3-(benzylsulfonyl)-2,2-dichloropropionitrile

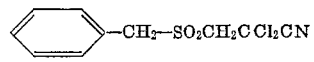

3-(benzylsulfonyl) propionitrile (62.7 grams; 0.3 mole) is dissolved in 1,000 milliliters of chloroform and the resulting mixture treated with gaseous chlorine (43 grams; 0.606 mole). The addition of the chlorine to the reaction mixture is carried out at a temperature of 21.5 to 25° C. over a period of 8 hours. Following the chlorination, the reaction mixture is washed with water and the chloroform layer which separates during the washing procedure removed by decantation. Thereafter, the chloroform is evaporated from the organic layer leaving a solid residue. The residue is successively recrystallized from methanol and chloroform to give the 3-(benzylsulfonyl)-2,2-dichloropropionitrile product as a solid melting at 103 to 104° C. The recrystallized product has chlorine, sulfur and nitrogen contents of 25.64 percent, 12.43 percent, and 4.67 percent, respectively, as compared with the theoretical contents of 25.4 percent, 11.5 percent, and 5.04 percent, respectively.

Example 6.—2,2-dichloro-3-(ethylsulfonyl)-propionic acid

Ethyl 2,2 - dichloro-3-(ethylsulfonyl)propionate (10.0 grams; 0.038 mole) is dispersed with stirring in 40 milliliters of water containing 0.1 milliliter of concentrated sulfuric acid and the reaction mixture heated with stirring at the boiling temperature and under reflux for 16 hours. Following this period, the reaction mixture is cooled to room temperature, extracted with diethyl ether and the ether extract dried over anhydrous sodium sulfate. The ether is then removed from the dried extract by evaporation under reduced pressure to obtain the 2,2-dichloro-3-(ethylsulfonyl)propionic acid product as a solid residue. This solid residue is recrystallized from chloroform. The recrystallized product melts at 157–157.5° C. and has a chlorine content of 29.77 percent as compared to the theoretical chlorine content of 30.15 percent.

Example 7.—Butyl 2,2-dichloro-3-(ethylsulfonyl) propionate

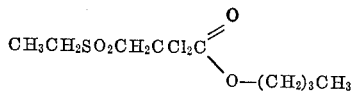

2,2 - dichloro - 3-(ethylsulfonyl)propionic acid (23.4 grams; 0.1 mole), butanol (7.4 grams; 0.1 mole) and sulfuric acid (1 milliliter) are dispersed in 200 milliliters of butanol. The reaction mixture is heated with stirring at a temperature of 70° C. for two hours and thereafter cooled to room temperature and diluted with 100 milliliters of ice water. During the dilution procedure, the reaction mixture separates into an aqueous phase and an organic phase. The organic phase is decanted and evaporated under reduced pressure to obtain the butyl 2,2-dichloro-3-(ethylsulfonyl)propionate product as a residue having a molecular weight of 289.9.

In a similar manner other compounds of the present invention are prepared as follows:

2,2 - dichloro-3-(ethylsulfonyl)propionamide (melting point 149–150° C.) by reacting together 2,2-dichloro-3-(ethylsulfonyl)propionitrile, sulfuric acid and water.

2,2 - dibromo - 3 - (isopropylsulfonyl)propionamide (molecular weight 214.9) by reacting together 2,2-dibromo - 3-(isopropylsulfonyl)propionitrile, ethanol, hydrogen chloride and water.

3-(benzylsulfonyl)-2,2-dichloropropionamide (melting point 152–153° C.) by reacting together 3-(benzylsulfonyl)-2,2-dichloropropionitrile, sulfuric acid and water.

2,2 - dichloro-3-(hexylsulfonyl)propionic acid (molecular weight 289.9) by reacting together butyl 2,2-dichloro-3-(hexylsulfonyl)propionate, water and toluene sulfonic acid.

2,2-dibromo-3-(isobutylsulfonyl)propionic acid (molecular weight 350.8) by reacting together methyl 2,2-dibromo-3-(isobutylsulfonyl)propionate, water, and hydrobromic acid.

3-(benzylsulfonyl)-2,2-dibromopropionic acid (molecular weight 384.8) by reacting together 3-(benzylsulfonyl)-2,2-dibromopropionamide, water, and phosphoric acid.

2,2-dichloro-3-(3-ethylbutylsulfonyl)propionitrile (molecular weight 296.9) by reacting 3-(3-ethylbutylsulfonyl)propionitrile and chlorine gas.

2,2-dibromo-3-(heptylsulfonyl)propionitrile (molecular weight 375.8) by reacting together 3-(heptylsulfonyl)propionitrile and bromine chloride.

2,2-dichloro-3-(methylsulfonyl)propionitrile (melting point 74–76° C.) by reacting together 3-(methylsulfonyl)propionitrile and chlorine gas.

2,2-dichloro-3-(tertiarybutylsulfonyl)propionitrile (molecular weight 323.8) by reacting together 3-(tertiarybutylsulfonyl)propionitrile and chlorine gas.

2,2-dibromo-3-(4-methylhexyl)propionitrile (molecular weight 375.8) by reacting together 3-(4-methylhexyl)propionitrile and bromine chloride.

2,2 - dichloro-3-(octylsulfonyl)propionitrile (melting point 53–55° C.) by reacting together 3-(octylsulfonyl)propionitrile and chlorine gas.

Isobutyl 2,2 - dibromo-3-(dodecylsulfonyl)propionate (molecular weight 538.8) by reacting together 2,2-dibromo-3-(dodecylsulfonyl)propionitrile, isobutanol, sulfuric acid and water.

n - Propyl 2,2 - dichloro - 3 - (methylsulfonyl)propionate (molecular weight 261.9) by reacting together 2,2-dichloro-3-(methylsulfonyl)propionic acid, n-propanol and hydrochloric acid as catalyst.

Ethyl 2,2-dichloro-3-(octylsulfonyl)propionate (refractive index $N_D^{25}$ 1.4793) by reacting together 2,2-dichloro-3-(octylsulfonyl)propionic acid, ethanol and hydrogen chloride.

The compounds of the present invention or compositions containing the same can be applied to pests and their habitats and food in parasiticidal amounts to obtain excellent control and kill of many organisms. Also, the compounds can be employed as slimicides in the white water in paper mills and in water employed in cooling towers. Additionally, the compounds can be included in inks, adhesives, soaps, cutting oils, or oil or latex paints, textiles, paper or wood to prevent mold and mildew and the degradation of such products resulting from microbial attack. Further the compounds can be employed as the toxic constituents and compositions for the control of blight and fungal diseases of various plants as well as for the control of various pests such as mites, insects, mollusks, and fish.

The compounds may be employed in liquid or dust formulations. In such usage the compounds are modified with one or a plurality of adjuvants or helpers including water, organic solvents, petroleum oils, petroleum distillates or other liquid carriers, surface active dispersing agents and finely divided solids such as chalk, talc, or bentonite. Depending upon the concentration of the parasiticide compound in such formulations, the augmented compositions are adapted to be distributed on plants or plant parts or in the soil, inks, adhesives, cutting oils, paints, or water or to be employed as concentrates and subsequently diluted with additional liquid or solid adjuvant to produce the ultimate treating compositions. The preferred organic solvent carriers are those of such volatility that they evaporate from the matter treated and leave little permanent residue therein. A preferred liquid adjuvant is a carefully cut petroleum distillate fraction boiling almost entirely under 400° F. and having a flash point above about 85° F. In the compositions, the adjuvant cooperates with the active agent so as to facilitate the invention and obtain an improved result.

The exact concentration of the dihalosulfones to be employed in the treating composition is not critical and may vary considerably provided the required amount of effective agent is applied to the pests or their habitats such as soil, ink, adhesives, cutting oils, paints, textiles, paper, wood and so forth. The concentration of toxicant liquid composition is generally from about 1 to 50 percent by weight. Concentrations up to 98 percent by weight oftentimes are conveniently employed. In dusts, the concentration of the toxicant can be from about 1 to 10 percent by weight. In compositions to be employed as concentrates, toxicant can be present in the concentration of about 5 to 98 percent by weight.

In representative operations, compositions containing 2,2-dichloro-3-(ethylsulfonyl)propionitrile at a concentration of 500 parts per million gave complete kills of *Aerobacter Aerogenes, Pseudomonas aeruginosa, Salmonella typhosa, Staphylococcus aureus, Aspergillus terreus, Pullularia pullulans* and *Rhizopus nigricans.*

In other operations, water containing 3-(benzylsulfonyl)-2,2-dichloropropionitrile at a concentration of 2 parts per million by weight gave complete kills of trashfish.

The sulfonylpropionitrile compounds employed as starting materials are prepared by known procedures. In such a procedure, acrylonitrile and an alkyl mercaptan having the formula RSH are reacted together in the presence of a catalytic amount of benzyltrimethyl-ammoniumhydroxide (Triton-B) to produce a substituted thiopropionitrile having the formula $RSCH_2CH_2CN$. This substituted thiopropionitrile compound is thereafter oxidized to the corresponding and desired sulfonyl propionitrile. The oxidation is carried out with either peracetic acid or a mixture of acetic acid, acetic anhydride and hydrogen peroxide, and at a temperature between 20 and 40° C. The desired sulfonyl propionitrile product is separated by conventional means.

I claim:

1. The compound having the structure $$R—SO_2—CH_2—CX_2—Y$$

wherein X represents bromide or chlorine, R represents alkyl containing from 1 to 12 carbon atoms, inclusive or benzyl, Y represents —COOH, —$COOR_1$ or —$CONH_2$ and $R_1$ represents lower alkyl containing from 1 to 4 carbon atoms, inclusive.

2. 2,2-dichloro-3-(ethylsulfonyl)propionamide.

3. Ethyl 2,2-dichloro-3-(ethylsulfonyl)propionate.

4. Ethyl 2,2-dichloro-3-(octylsulfonyl)-propionate.

References Cited

UNITED STATES PATENTS 3,078,298 2/1963 Gregory et al. ---- 260—465.4

OTHER REFERENCES

Chemical Abstracts, 34:5763[9].
Chemical Abstracts, 34:7860[6].
Chemical Abstracts, 35:2114[6].

LORRAINE A. WEINBERGER, *Primary Examiner.*

P. J. KILLOS, *Assistant Examiner.*

U.S. Cl. X.R.

260—539, 515, 558, 561, 470